(12) United States Patent
Goldschlager

(10) Patent No.: US 8,392,548 B1
(45) Date of Patent: Mar. 5, 2013

(54) METHOD AND APPARATUS FOR GENERATING DIAGNOSTIC INFORMATION FOR ERRORS DETECTED IN A NETWORK MANAGEMENT PROTOCOL

(75) Inventor: Robi Goldschlager, Tel-Aviv (IL)

(73) Assignee: Marvell International Limited, Hamilton (BM)

( * ) Notice: Subject to any disclaimer, the term of this patent is extended or adjusted under 35 U.S.C. 154(b) by 139 days.

(21) Appl. No.: 12/791,727

(22) Filed: Jun. 1, 2010

Related U.S. Application Data

(63) Continuation of application No. 10/936,297, filed on Sep. 7, 2004, now Pat. No. 7,739,346.

(60) Provisional application No. 60/537,498, filed on Jan. 20, 2004.

(51) Int. Cl.
*G06F 15/173* (2006.01)

(52) U.S. Cl. .......................................... 709/223; 709/224

(58) Field of Classification Search .................. 709/223, 709/224
See application file for complete search history.

(56) References Cited

U.S. PATENT DOCUMENTS

| | | | |
|---|---|---|---|
| 6,018,567 A | 1/2000 | Dulman | |
| 6,516,345 B1 | 2/2003 | Kracht | |
| 6,832,247 B1 | 12/2004 | Cochran et al. | |
| 7,139,823 B2 | 11/2006 | Benfield et al. | |
| 7,254,645 B2* | 8/2007 | Nishi | 709/249 |
| 7,260,635 B2 | 8/2007 | Pandya et al. | |
| 2003/0055963 A1* | 3/2003 | Butt et al. | 709/225 |
| 2008/0040469 A1* | 2/2008 | Nishi | 709/223 |
| 2009/0158096 A1* | 6/2009 | Ali et al. | 714/43 |

OTHER PUBLICATIONS

Case et al., "A Simple Network Management Protocol (SNMP)," RFC 1157, May 1990, pp. 1-36, http://www.faqs.org/ftn/rfc/pdf/rfc1157.txt.pdf.
Case et al., "Protocol Operations for Version 2 of the Simple Network Management Protocol (SNMPv2)," Rfc 1905, Jan. 1996, pp. 1-24, hap://www. fa qs.org/ftp/rfcipd f,' rfc I 9 05.1x1 .pci f.

* cited by examiner

*Primary Examiner* — Mohamed Wasel

(57) ABSTRACT

Method and apparatus for managing a network use one or more diagnostic objects in a Management Information Base (MIB). In some implementations, a managed network device is provided that includes a management module configured to receive a request from a remote device on a network to perform one or more network management tasks. The managed network device also includes an execution engine configured to identify one or more errors associated with the request. The managed network device also includes a diagnostic engine configured to generate diagnostic information associated with the one or more identified errors. The diagnostic information can include textual information identifying one or more origins giving rise to the one or more identified errors.

20 Claims, 4 Drawing Sheets

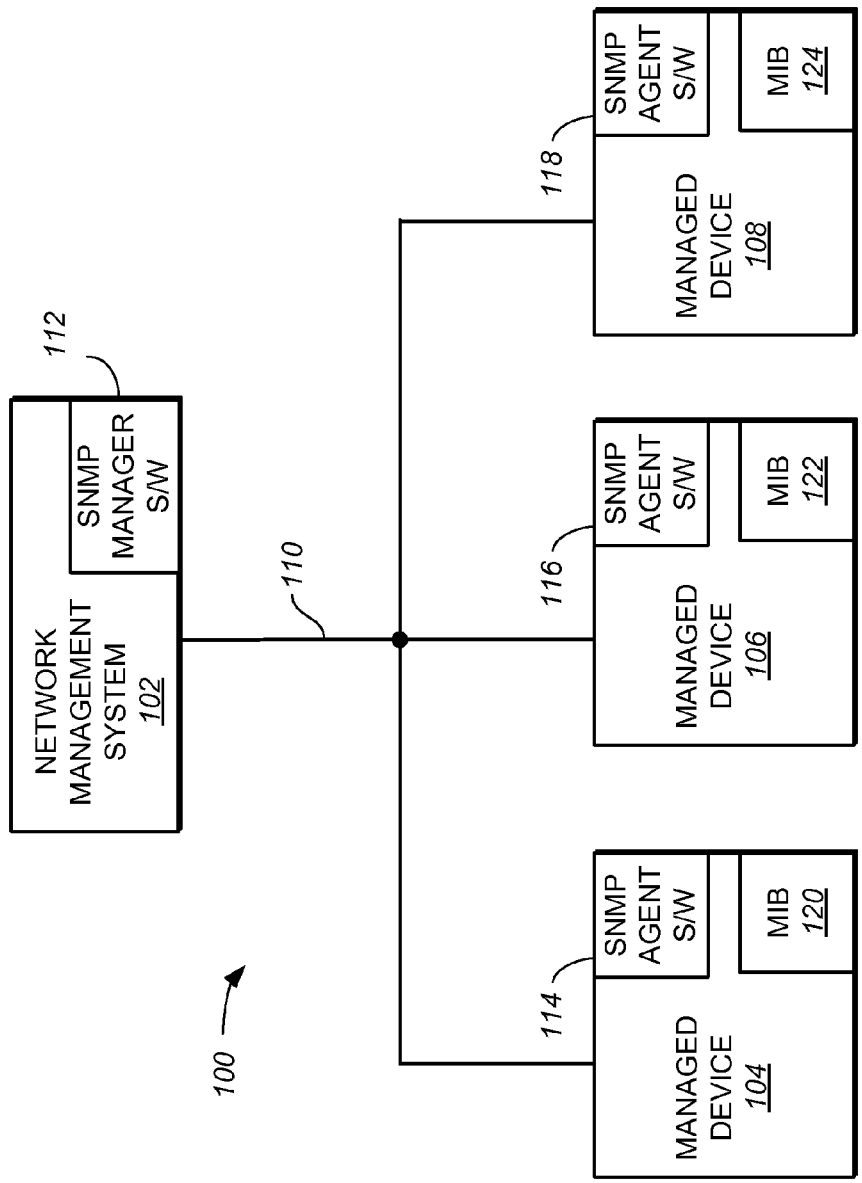
FIG. _1

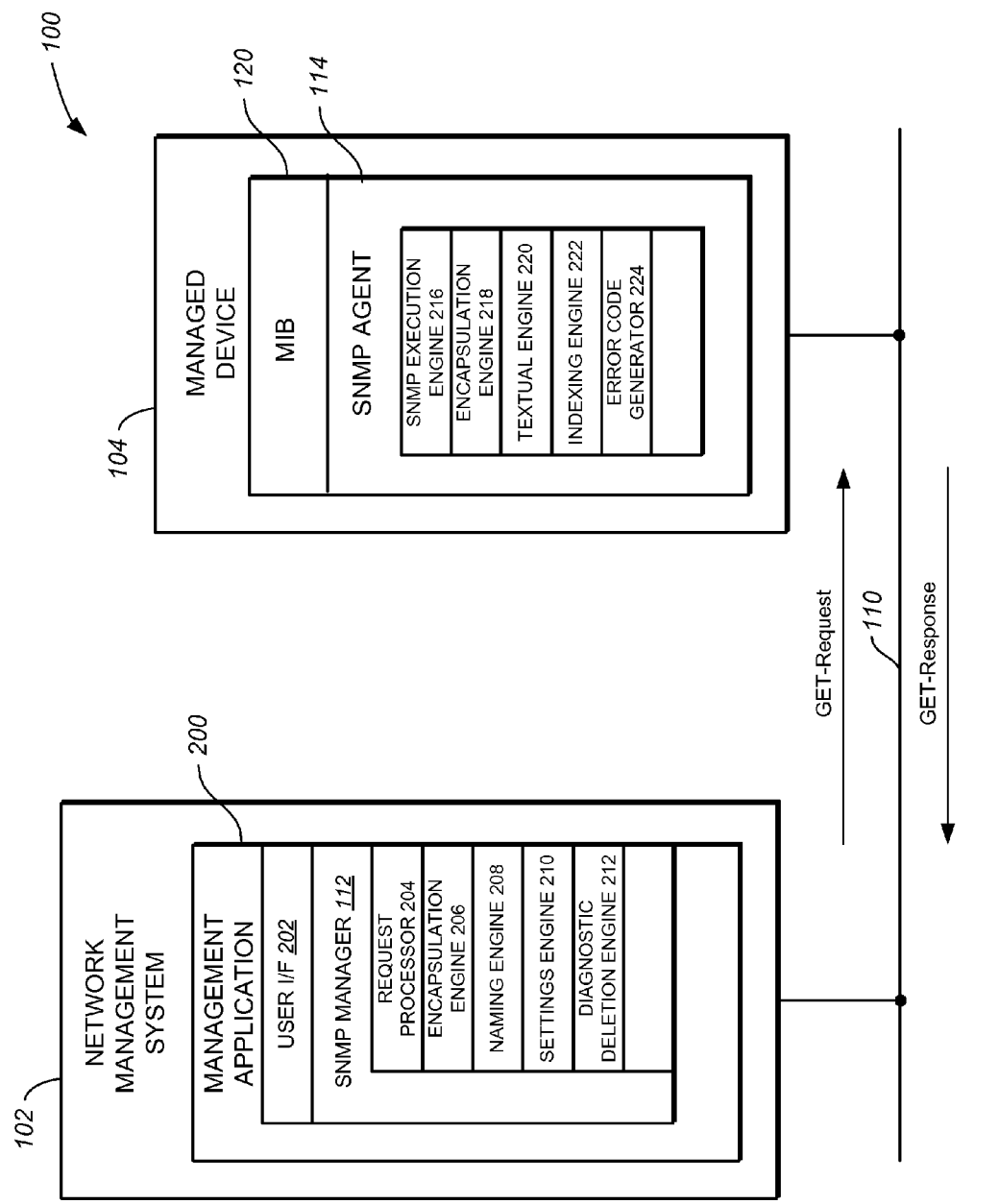

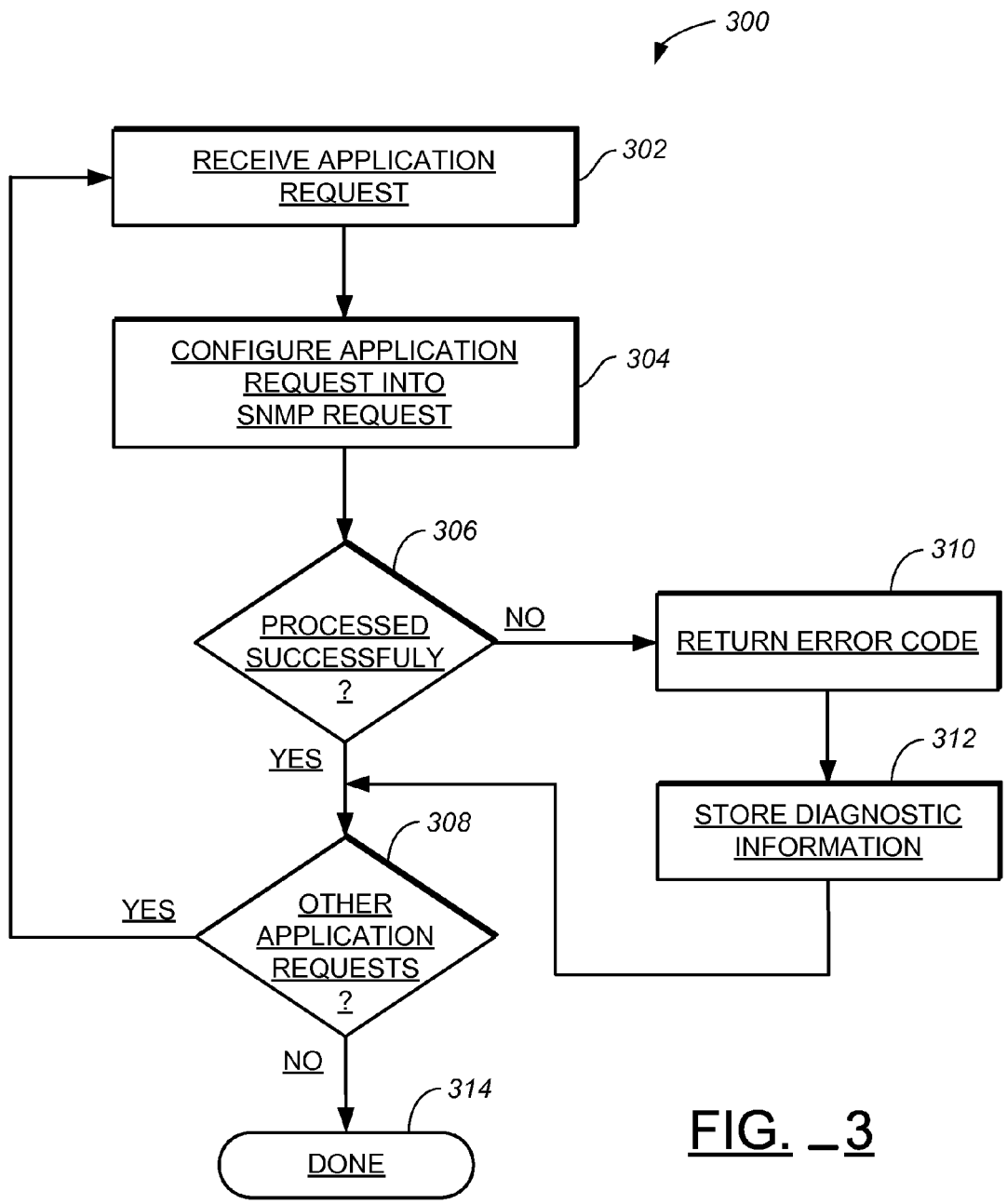
FIG. _3

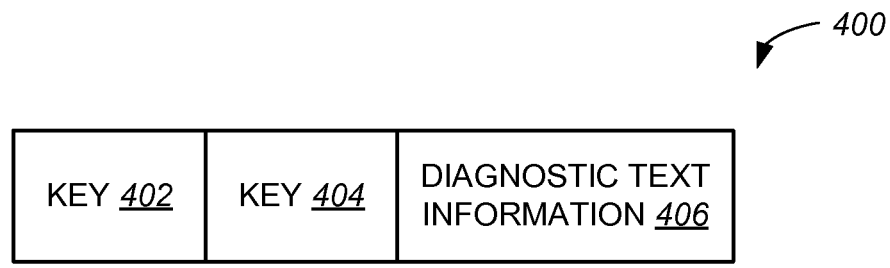
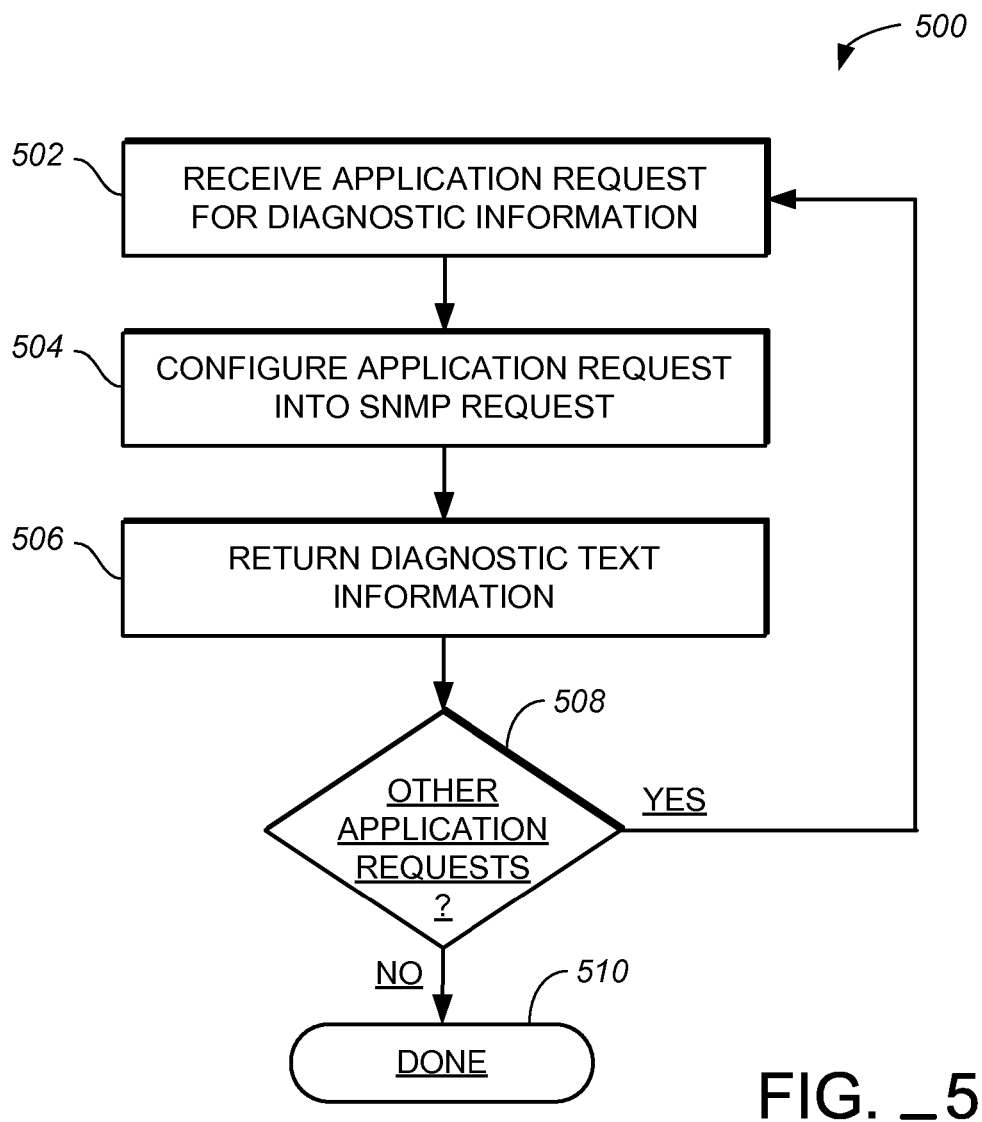

METHOD AND APPARATUS FOR GENERATING DIAGNOSTIC INFORMATION FOR ERRORS DETECTED IN A NETWORK MANAGEMENT PROTOCOL

CROSS-REFERENCE TO RELATED APPLICATIONS

This application is a continuation of U.S. application Ser. No. 10/936,297, filed Sep. 7, 2004, which claims the benefit of U.S. Provisional Patent Application No. 60/537,498, filed on Jan. 20, 2004, the disclosure of each of which is incorporated herein by reference in its entirety.

BACKGROUND

The following disclosure relates to network devices and network communication.

Network management generally takes place between two types of systems, systems in control—called network management systems (NMS), and observed/controlled devices—called managed devices. Managed devices can include, e.g., hosts, servers, routers, repeaters, switches, and computers.

A management protocol is generally used to convey management information between a network management system and a managed device. One example management protocol is the Simple Network Management Protocol (SNMP). SNMP provides a way for network management systems to organize a large amount of information needed to manage a variety of managed devices.

A managed device typically includes specialized software modules, called agents, that access information about the managed device, and make the information available to a network management system. Managed devices maintain values for a number of variables and report the variables, as required, to a network management system. For example, an agent might report the number of bytes and packets in and out of a particular managed device, or the number of broadcast messages sent and received. In the SNMP Network Management Framework, each of these variables is referred to as a managed object. In the context of SMNP, a managed object represents anything that can be managed, or anything that an agent can access and report back to a network management system. A managed object can have a name, one or more attributes, and include a set of operations that can be performed by the managed object. Managed objects are typically contained in a Management Information Base (MIB), a database of the managed objects.

A network management system can control a managed device by sending an SNMP command to an agent of the managed device requiring the managed device to, for example, change the value of one or more variables. Commonly used SNMP commands include, e.g., GET-Request (retrieves one or more values from a managed object), SET-Request (updates selected variables of a managed object), and GET-Response (a reply to a GET-Request or a SET-Request). SNMP commands—including requests and responses—are sent between network management systems and managed devices as SNMP messages. An SNMP message is an SNMP protocol data unit (PDU) that includes message header elements defined by a particular Request for Comments (RFC).

When an SNMP command fails, a network management system typically sends an SNMP error code back to a user—e.g., a human network administrator. However, SNMP provides only a limited number of error codes. For version 1 of SNMP (SNMPv1), the following five error codes are supported: tooBig(1), noSuchName(2), badValue(3), readOnly(4), and genErr(5). See RFC 1157, Case, May 1990, A Simple Network Management Protocol (SNMP), incorporated herein by reference. For version 2 of SNMP (SNMPv2), the following 18 error codes are supported: tooBig(1), noSuchName(2), badValue(3), readOnly(4), and genErr(5), noAccess(6), wrongType(7), wrongLength(8), wrongEncoding(9), wrongValue(10), noCreation(11), inconsistentValue(12), resourceUnavailable(13), commitFailed(14), undoFailed(15), authorizationError(16), notWritable(17), and inconsistentName(18). See RFC 1905, Case, January 1996, Protocol Operations for Version 2 of the Simple Network Management Protocol (SNMPv2), incorporated herein by reference.

In some cases, more specific information about an error is known when an SNMP command fails. However, when a conventional SNMP protocol is used, the specific information about the error is not passed back to a user. Instead, the specific information about the error is converted (or mapped) into an error code that can generally only notify a user that a particular type of error has occurred. The error code typically does not convey why the error occurred. For example, an error code of wrongValue in response to a failed SNMP SET-Request command does not convey why the value associated with the SNMP SET-Request is wrong.

SUMMARY

In general, in one aspect, this specification describes a method for processing a network management protocol command at a managed device in a network. The method includes receiving a network management protocol command at a managed device in a network, and determining whether the network management protocol command was processed successfully at the managed device. If the network management protocol command was not processed successfully at the managed device, then the method further includes storing data related to the network management protocol command that was not processed successfully at the managed device.

Particular implementations can include one or more of the following features. Storing data can include storing diagnostic text information related to the network management protocol command that was not processed successfully at the managed device. The method can further include generating the diagnostic text information related to the network management protocol command that was not processed successfully at the managed device. Receiving a network management protocol command can include receiving a network management protocol command from a network management system in the network.

The method can further include sending, from the managed device, an error code associated with the network management protocol command that was not processed successfully to the network management system. Receiving a network management protocol command can include receiving an SNMP protocol command. Sending an error code can include sending one of a plurality of SMNP error codes of an SNMPv1 standard or an SNMPv2 standard. Storing diagnostic text information can include storing a string of text representing a reason why the network management protocol command was not processed successfully. Storing diagnostic text information can also include generating a diagnostic object associated with the network management protocol command that was not processed successfully, and storing the diagnostic text information in the diagnostic object. Generating a diagnostic object can include generating a diagnostic table object. Storing the diagnostic text information can include storing the diagnostic text information within the diagnostic table object. Storing the diagnostic text information within the diagnostic table object can include storing the diagnostic information based on at least two keys. The first key represents an identifier of the network management system that issued the network management protocol command that was not processed successfully, and the second key represents an identifier of the network management protocol command that was not processed successfully. Each of the first key and the second key can represent an index for locating a logical row in the diagnostic table object.

The method can further include receiving, from the network management system, a second network management protocol command containing an object identifier that identifies the diagnostic table object that contains diagnostic text information related to the network management protocol command that was not processed successfully, retrieving the diagnostic text information from the diagnostic table object, and sending the diagnostic text information to the network management system. Receiving a network management protocol command at a managed device can include receiving a network management protocol command at a device that includes a network interface. Receiving a network management protocol command at a device that includes a network interface can include receiving a network management protocol command at one of a host, router, bridge, computer, modem, or terminal server.

In general, in another aspect, this specification describes a method for processing a request for information related to a network management protocol command through a network management system. The method includes receiving an application request from a requestor for information associated with a previously sent network management protocol command that was not processed successfully at a managed device, configuring the application request into a second network management protocol command, sending the second network management protocol command from the network management system to the managed device, and receiving diagnostic text information from the managed device responsive to the request.

Particular implementations can include one or more of the following features. The method can further include displaying the diagnostic text information to the requestor, and deleting the diagnostic text information at the managed device. Configuring the application request can include configuring the application request into an SNMP command. Configuring the application request into an SNMP command can include configuring an SNMP command containing an object identifier identifying a diagnostic object that contains the diagnostic text information.

The method can further include setting an identifier for the network management system at the managed device, the managed device using the identifier of the network management system to store the diagnostic text information. Setting an identifier for the network management system can include setting the identifier to be one the following: (1) an IP (Internet Protocol) address associated with the network management system, (2) a user name/community name corresponding to the network management system, or (3) a concatenation of an IP address and a user name/community of the network management system. The method can further include setting an identifier of the previously sent network management protocol command that was not processed successfully at a managed device. The managed device uses the identifier of the network management system to store the diagnostic text information.

In general, in another aspect, this specification describes a managed device in a network. The managed device includes an agent operable to receive a network management protocol command, and an execution engine operable to determine whether the network management protocol command was processed successfully. If the network management protocol command was not processed successfully at the managed device, the managed device further includes an indexing engine operable to store, within a storage device, data related to the network management protocol command that was not processed successfully.

In general, in another aspect, this specification describes a network management system in a network. The network management system includes: a manager operable to receive an application request from a requestor for information associated with a previously sent network management protocol command that was not processed successfully at a managed device in the network; a request processor operable to configure the application request into a second network management protocol command; and an encapsulation engine operable to send the second network management protocol command from the network management system to the managed device. The manager is further operable to receive diagnostic text information from the managed device responsive to the request.

Implementations can include one or more of the following advantages. A method and apparatus is provided for managing a network using one or more diagnostic objects in a Management Information Base (MIB). The one or more diagnostic objects include a diagnostic table object for storing diagnostic text information. The diagnostic text information relates to failed transactions generated by, in one implementation, SNMP agents of managed devices. A network management system can access the diagnostic table object and provide the diagnostic text information to a user. Advantageously, errors generated by an agent do not have to be translated (or mapped) into an error code, e.g., SNMP error codes or any other error codes. A network administrator can, therefore, obtain a greater amount of information as to why an SNMP command failed.

The details of one or more implementations are set forth in the accompanying drawings and the description below. Other features and advantages will be apparent from the description and drawings, and from the claims.

DESCRIPTION OF DRAWINGS

FIG. 1 is a block diagram of a management portion of a managed network.

FIG. 2 is block diagram of device architectures of a network management system and a managed device.

FIG. 3 is a flowchart illustrating a method for managing the network of FIG. 1.

FIG. 4 illustrates a diagnostic object.

FIG. 5 is a flowchart illustrating a method for retrieving diagnostic information of a failed transaction in the network of FIG. 1.

Like reference symbols in the various drawings indicate like elements.

DETAILED DESCRIPTION

FIG. 1 illustrates a block diagram of a network 100. Network 100 includes a network management system 102, a first managed device 104, a second managed device 106, and a third managed device 108. Though one network management system 102 and three managed devices 104-108 are illustrated in FIG. 1 by way of example, network 100 can contain a different number of network management systems and/or managed devices.

Network 100 also includes a network medium 110 operable to carry communication messages between network management system 102 and managed devices 104-108. Network medium 110 can be any suitable communication medium—e.g., high-frequency coaxial cable, twisted pair cable, fiber optic cable, wireless links, and so on. In addition to the physical connection (i.e., network medium 110), a communication protocol is used to facilitate communication between network management system 102 and managed devices 104-108. In one implementation, network 100 uses a media access control (MAC) protocol to communicate data. Types of MAC protocols include, for example, Ethernet, token ring, Fiber Distributed Data Interface (FDDI), Cells In Frames (CIF), and other data link layer protocols.

Network management system 102 can be a computer that includes an SNMP manager 112 for managing network 100. In one implementation, SNMP manager 112 manages network 100 using the SNMP protocol.

Managed devices 104-108 can include any device that communicates over a network. Examples of such devices include hosts, routers, terminal servers, bridges, computers, modems, and other devices having a network interface. In one implementation, managed devices 104-108 respectively include SNMP agents 114-118 and MIBs 120-124. Each of SNMP agents 114-118 accesses and modifies corresponding managed objects (discussed in greater detail below) within MIBs 120-124 in response to SNMP commands from network management system 102. In one implementation, the managed objects include one or more diagnostic objects (discussed in greater detail below) that are operable to store diagnostic text information corresponding to failed SNMP commands, and provide the diagnostic text information to an SNMP manager, e.g., SNMP manager 112. In one implementation, the diagnostic objects are generated at run-time by one or more of SNMP agents 114-118 as a byproduct of a failed SNMP command. The diagnostic objects can be defined according to a diagnostic MIB module associated with MIBs 120-124.

FIG. 2 shows device architecture block diagrams for network management system 102 and managed device 104 in one implementation. Network management system 102 includes a management application 200. Management application 200 includes a user interface 202 and SNMP manager 112.

Management application 200 is a network management application that provides a user interface 202 for receiving application requests from a requestor (e.g., a network administrator or computer), and for providing information about network 100 to the requestor. An application request includes requests by the requestor to perform network management-related tasks on a managed device, e.g., managed devices 104-108. For example, a requestor may use manager application 200 to request diagnostic text information related to a failed SNMP command at managed device 104. To support requests, management application 200 includes a retrieval routine (e.g., SNMP manager 112) that retrieves the requested information. In one implementation, SNMP manager 112 includes a request processor 204, an encapsulation engine 206, a naming engine 208, a settings engine 210, and a diagnostic deletion engine 212.

Request processor 204 is operable to generate one or more network management protocol requests for, inter alia, retrieving diagnostic text information from a managed device (e.g., managed device 104) based on application requests. In one implementation, request processor 204 generates network management protocol requests including SNMP commands to retrieve diagnostic text information from a managed device. The SNMP commands can include, for example, GET-Requests, SET-Requests, and GET-Responses.

Encapsulation engine 206 is operable to encapsulate network management protocol requests (e.g., SNMP commands generated by request processor 204) into one or more protocol data unit (PDU) packets. In one implementation, encapsulation engine 206 is also operable to send PDU packets to one or more managed devices through one or more network layers and a physical layer.

Naming engine 208 is operable to set an identifier (ID) for a network management system (e.g., network management system 102). The ID for a network management system can be set within a managed object at each managed device in a network. In one implementation, a network management system has an ID based on: (1) an IP (Internet Protocol) address associated with the network management system, (2) a user name/community name corresponding to the network management system, or (3) both an IP address and a user name/community of the network management system combined—i.e., a concatenation of the network management system's IP address and user name/community name.

Naming engine 208 is further operable to set an ID of each SNMP command (e.g., GET, GET NEXT, GET BULK and SET) sent by a network management system. In one implementation, the ID of each SNMP command is set within a managed table object. The managed table object is operable to store IDs of several SNMP commands of a network management system that issues several SNMP commands prior to listening to a response. Alternatively, the ID of an SNMP command can be set within a managed object that does not have a tabular format.

Settings engine 210 is operable to set a duration (or time period) for how long a managed device maintains various settings (of managed objects) set by a network management system. The settings includes, e.g., an ID of a network management system, an ID of an SNMP command, and other settings set by a network management system. The time periods can be maintained within a managed object at each managed device. The time periods can be set according to any convenient granularity—e.g., seconds, minutes, hours, and so on.

Diagnostic deletion engine 212 is operable to delete diagnostic text information stored within a diagnostic object. Diagnostic objects are discussed in greater detail below. Diagnostic text information stored within a diagnostic object can be deleted to free resources of a managed device.

FIG. 2 also shows managed device 104 in greater detail. Managed device includes MIB 120 and SNMP agent 114. In one implementation, SNMP agent 114 includes an SNMP execution engine 216, an encapsulation engine 218, a textual engine 220, an indexing engine 222, and an error code generator 224.

SNMP execution engine 216 is operable to execute one or more received SNMP commands of a network management system (e.g., network management system 102).

Encapsulation engine 218 is operable to encapsulate network management protocol replies (e.g., SNMP GET-Response replies) generated by managed device 104 into one or more PDU packets. In one implementation, encapsulation engine 218 is further operable to send PDU packets to one or more network management systems through one or more network layers and a physical layer.

Textual engine 220 is operable to generate diagnostic text information corresponding to a failed SNMP command at managed device 104. Diagnostic text information generally includes descriptive information as to why a given SNMP command failed. The descriptive information can be stored as a string of text. In one implementation, multi-line diagnostic text information is generated by textual engine 220. Example diagnostic text information (in the management of routing tables) include "Destination Address for Route is not valid", "IP mask does not cover the destination address", and "Only a directly connected router can be defined as the gateway". An SNMP error code that corresponds to each of the examples above is wrongValue, which does not convey as much information as the diagnostic text information.

Indexing engine 222 is operable to index (or store) diagnostic text information within a storage device, e.g., a Management Information Base (MIB). In one implementation, indexing engine stores the diagnostic text information in a diagnostic object (discussed in greater detail below). In one implementation, indexing engine 222 indexes diagnostic text information according to an ID of a network management system that issued the failed SNMP command and according to an ID of the particular failed SNMP command.

Error code generator 224 is operable to generate an SNMP error code corresponding to a failed SNMP command. In one implementation, an error code is sent to, e.g., a network administrator to inform the network administrator that a previously sent SNMP command has failed at a given managed device. The network administrator may then issue a request through management application 200 to retrieve diagnostic text information corresponding to the failed SNMP command.

For example, the request processor 204 can configure a GET-Request command that includes an object identifier identifying a diagnostic object or variable (that contains the diagnostic text information related to the failed SNMP command) to be retrieved from managed device 104. Encapsulation engine 206 encapsulates the Get-Request command in a PDU packet and sends the GET-Request command to managed device 104, e.g., through one or more network layers and a physical layer (not shown).

The GET-Request command is received at managed device 104, e.g., through one or more network layers and a physical layer (not shown). SNMP execution engine 216 executes the GET-Request command and obtains diagnostic text information related to the failed SNMP command from a diagnostic object (not shown) within MIB 120. In one implementation, MIB 120 includes a diagnostic MIB module (not shown) that contains one or more diagnostic objects. The diagnostic MIB module is associated with a private MIB of managed device 104.

The diagnostic text information is then sent back to network management system 102 in a GET-Response reply. For example, encapsulation engine 218 can encapsulate the GET-Response reply in a PDU packet and send the GET-Response reply to network management system 102, e.g., through one or more network layers and a physical layer (not shown).

The GET-Response reply is received at network management system 102. Management application 200 can provide the GET-Response reply, including the diagnostic text information related to the failed SNMP command, to a requestor (e.g., through user interface 202 of management application 200).

FIG. 3 illustrates a process 300 for managing application requests in network 100 (FIG. 1). An application request is received (step 302). An application request is a request from a requestor to perform one or more network management-related tasks on a managed device (e.g., managed device 104 of FIG. 1) in a network. The application request can be received based on a requestor executing a command through, for example, management application 200 (FIG. 2). The application request is configured into an SNMP command (step 306). In one implementation, a request processor (e.g., request processor 204 of FIG. 2) configures the application request into an SNMP command—e.g., a SET-Request command. The application request can be configured into other types of management protocol commands depending upon management protocol requirements of a network. For example, other types of management protocols include protocols that support managed information structures in Abstract Syntax Notation One (ASN.1)—e.g., Common Management Information Protocol (CMIP).

A determination is made whether the SNMP command was processed successfully at a managed device (step 306). In one implementation, an SNMP execution engine (e.g., execution engine 216 of FIG. 2) determines whether an SNMP command was successfully processed at the managed device. If the SNMP command was successfully processed at the managed device, then a determination is made whether there are any other application requests (step 308). If there are more application requests then process 300 returns to step 302. If there are no more application requests then process 300 ends (step 314).

If the SNMP command was not successfully processed at a managed device, then an error code is returned, e.g., to a requestor (step 310). In one implementation, an error code generator (e.g., error code generator 224 of FIG. 2) returns an error code to a requestor through a network management system. The error code can include, for example, one or more of the five SNMP error codes associated with SNMPv1, the eighteen SNMP error codes associated with SNMPv2, and other error codes generated by e.g., software applications running at the managed device.

Diagnostic text information about the failed SNMP command is stored (step 312). In one implementation, an indexing engine (e.g., indexing engine 222 of FIG. 2) stores the diagnostic text information in a diagnostic object contained within an MIB of the managed device. The diagnostic objects can be generated during run-time as a byproduct of a failed SNMP command. The diagnostic text information generally contains information about why an SNMP command failed. For example, the diagnostic information generally includes text information that is useful for a requestor, such as a network administrator, to understand and correct errors associated with a failed SNMP command. In one implementation, a line number representing a location in software code where the SNMP command failure occurred is also stored within a diagnostic object.

In one implementation, the diagnostics objects include diagnostic table objects 400 for storing diagnostic text information, as shown in FIG. 4. In one implementation, a diagnostic table object 400 has (2) keys 402, 404 that are used to index diagnostic text information 406 for storage and retrieval purposes. A key represents an index for locating a particular logical row in diagnostic table object 400 in which diagnostic text information 406 is stored. In one implementation, the first key 402 represents the ID of the network management system that issued the failed SNMP command. As discussed above, a network management system can be identified by an IP address, user/community name, or both by IP address and user/community name. In one implementation, first key 402 is implicit (or hidden)—i.e., not part of the formal definition of diagnostic table object 400. Because a network may include several network management systems, making first key 402 implicit prevents one network management system from retrieving diagnostic text information of another network management system's failed SNMP command—i.e., a given network management system can only access diagnostic text information that is indexed according to that network management system's particular ID.

The second key 404 can represent the ID of a particular SNMP command. In one implementation, an SNMP command is identified according to the request-ID field in the SNMP PDU corresponding to the SNMP command. Alternatively, the ID of a given SNMP command can be identified according to the ID given to the particular SNMP command by a naming engine (e.g., naming engine 208 of FIG. 2) of a network management system (e.g., network management system 102).

FIG. 5 illustrates a process 500 for retrieving diagnostic text information in a network (e.g., network 100 of FIG. 1). An application request for diagnostic information is received (step 502). The application request for diagnostic information can be received based on a requestor, e.g., a network administrator, executing a command through management application 200 (FIG. 2). In one implementation, a requestor is notified that a previously sent SNMP command failed by the requestor receiving an SNMP error code through user interface 202 of management application 200 (FIG. 2). The application request for diagnostic information is configured into an SNMP command (step 504). In one implementation, request processor 204 (FIG. 2) configures the application request for diagnostic information into an SNMP GET-Request command. In one implementation, the GET-request command contains an object identifier that identifies a diagnostic table object (within an MIB of a managed device) that contains diagnostic text information related to a previously sent failed SNMP command. In one implementation, the diagnostic text information is retrieved from the diagnostic table object according to the ID of the network management system and the ID of the particular failed SNMP command.

Diagnostic text information is returned (step 506). In one implementation, diagnostic text information retrieved from a diagnostic table object is displayed to a requestor through user interface 202 of management application 200 (FIG. 2). Optionally, the diagnostic text information can be deleted (e.g., using diagnostic deletion engine 212 of FIG. 2) once the diagnostic text information is displayed to the requestor. A determination is made whether there are any more application requests for diagnostic information (step 508). If there are more application requests for diagnostic information then process 500 returns to step 502. If there are no more application requests for diagnostic information then process 500 ends (step 510).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array), an ASIC (application-specific integrated circuit), or discrete components or combinations thereof.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

A number of implementations have been described. Nevertheless, it will be understood that various modifications may be made. For example, the diagnostic objects can be used to store text strings other than error information. The diagnostic text information can also provide warnings or other information related to a given network management protocol command (e.g., an SNMP request). In such a case, a network management system can retrieve the diagnostic text information even when the network management protocol command was successful. Also, any other network connectivity/efficiency checking commands issued via a network management protocol (e.g., SNMP) can place results of corresponding commands in textual form within one or more diagnostic object, including diagnostic table objects.

Accordingly, other implementations are within the scope of the following claims.

What is claimed is:

1. A managed network device comprising:
    a management module configured to receive a network management protocol command and a request from a remote device on a network to perform one or more network management tasks;
    an execution engine configured to process the network management protocol command and the request received from the remote device to identify one or more errors associated with the request, where the one or more identified errors indicate that the network management protocol command associated with the one or more network management tasks failed to be processed successfully at the managed network device; and
    a diagnostic engine configured to generate diagnostic information associated with the one or more identified errors, the diagnostic information including textual information identifying one or more origins giving rise to the one or more identified errors.

2. The managed network device of claim 1, further comprising an error generator configured to generate error information corresponding to the one or more identified errors without generating error codes corresponding to the one or more identified errors.

3. The managed network device of claim 1, where the diagnostic engine is further configured to store the generated diagnostic information in a diagnostic object, the diagnostic object including a diagnostic data structure for indexing the generated diagnostic information.

4. The managed network device of claim 3, further comprising an indexing engine configured to index the generated diagnostic information in the diagnostic object.

5. The managed network device of claim 4, where the indexing engine is configured to index the generated diagnostic information based on identification information associated with a network management system from which the request is received and identification information associated with the received request.

6. The managed network device of claim 1, where the management module is further configured to:
receive a retrieval request from a requestor to retrieve the generated diagnostic information in response to a notification informing the requestor of the one or more identified errors; and
send the retrieved generated diagnostic information to the requestor in response to the retrieval request.

7. The managed network device of claim 1, where the diagnostic engine is further configured to generate diagnostic information that is protocol independent.

8. The managed network device of claim 1, where the management module is further configured to receive a Simple Network Management protocol (SNMP) command in the request, and the diagnostic engine is further configured to generate textual information specifying descriptive information associated with the one or more errors in the SNMP protocol command.

9. A system comprising:
a network management device for managing one or more network management tasks in a network; and
one or more managed devices configured to handle the one or more network management tasks, each managed device including:
a management module configured to receive one or more network management protocol commands and one or more requests from the network management device to fulfill the one or more network management tasks;
an execution engine configured to process the one or more network management protocol commands and the one or more requests received from the network management device to identify one or more errors associated with the one or more requests, where an identified error of the one or more errors indicates that a network management protocol command associated with a network management task failed to be processed successfully at the managed device; and
a database configured to store one or more managed objects, each managed object including textual diagnostic information associated with a failed command.

10. The system of claim 9, where at least one of the one or more managed devices is configured to generate the diagnostic information including information identifying one or more errors that result in the management module failing to fulfill a corresponding network management task.

11. The system of claim 9, where the management module is configured to generate the one or more managed objects at run-time as a by-product of the failed request command.

12. The system of claim 9, where the database is configured to store a diagnostic data structure for indexing the textual diagnostic information in at least one of the one or more managed objects.

13. The system of claim 9, where at least one of the one or more managed devices is configured to index the textual diagnostic information in the one or more managed objects.

14. The system of claim 13, where at least one of the one or more managed devices is configured to index the textual diagnostic information based on identification information associated with the network management device and identification information associated with the failed command.

15. The system of claim 9, where the management module is further configured to:
receive a retrieval request from a requestor to retrieve the diagnostic information after receiving a notification informing the requestor of the failed command; and
send the retrieved diagnostic information to the requestor in response to the retrieval request.

16. The system of claim 9, where at least one of the one or more managed devices is configured to generate diagnostic information that is protocol independent.

17. The system of claim 9, where the management module is configured to receive a Simple Network Management protocol (SNMP) command in at least one of the one or more requests, and where at least one of the one or more managed devices is configured to generate the textual diagnostic information specifying descriptive information associated with one or more errors in the SNMP protocol command.

18. A method comprising:
receiving a network management protocol command and a request to perform one or more network management tasks;
processing the received network management protocol command and the received request;
identifying one or more errors associated with the received request, where the one or more identified errors indicate that the network management protocol command associated with the one or more network management tasks failed to be processed successfully at the managed network device;
generating diagnostic information indicative of the one or more identified errors including generating textual information identifying one or more origins giving rise to the one or more identified errors; and
generating a diagnostic object for storing the diagnostic information.

19. The method of claim 18, where generating the diagnostic information includes generating a first key containing identification information associated with a network management device from which the request is received and a second key containing identification information associated with the received request.

20. The method of claim 18, further comprising:
receiving, from a requestor, a retrieval request containing information identifying the diagnostic object;
retrieving the generated diagnostic information contained in the identified diagnostic object based on the retrieval request; and
sending the identified diagnostic object including the retrieved generated diagnostic information to the requestor.

* * * * *